July 16, 1946.   E. N. OLSON   2,404,246
BRUSH RIGGING
Filed Dec. 24, 1943
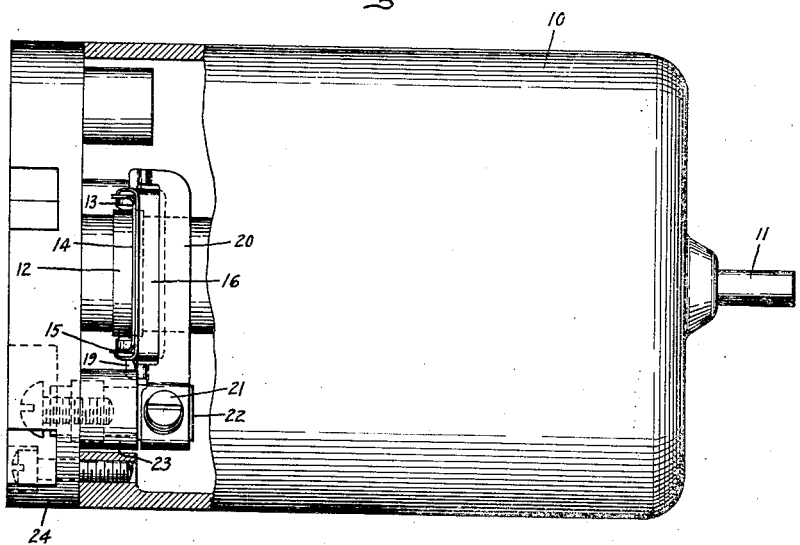
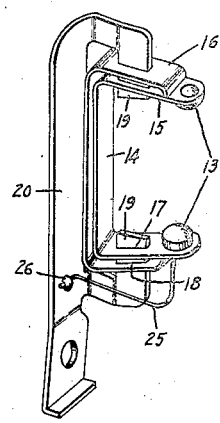
Inventor:
Edwin N. Olson,
by Harry C. Dunham
His Attorney.

Patented July 16, 1946

2,404,246

UNITED STATES PATENT OFFICE 2,404,246

BRUSH RIGGING

Edwin N. Olson, Schenectady, N. Y., assignor to General Electric Company, a corporation of New York Application December 24, 1943, Serial No. 515,469

9 Claims. (Cl. 171—324)

My invention relates to a brush rigging and particularly to an arrangement for movably supporting brushes to permit them to follow the contours of a current collector such as a slip ring under severe conditions of vibration.

An object of my invention is to provide an improved brush rigging for a rotatable current collector.

Another object of my invention is to provide an improved brush rigging in which a pair of brushes is slidably supported and biased towards each other into engagement with a current collector.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly broken away, of a dynamoelectric machine provided with an embodiment of my improved brush rigging; and Fig. 2 is a perspective view of the brush rigging shown in Fig. 1.

Referring to the drawing, I have shown a dynamoelectric machine provided with a stationary member 10 and a rotatable member mounted on a shaft 11 within the stationary member 10 and provided with a current collector including a slip ring 12 mounted on the shaft 11. Electrical contact is adapted to be formed with the rotatable current collector 12 through a pair of brush elements 13 which are mounted on a substantially U-shaped brush mounting element 14 formed of a leaf spring. The mounting element 14 is provided with a pair of legs 15 adjacent the outer ends of which the brush elements 13 are secured, and these legs are formed, as shown in Fig. 2, such that the space between the brush elements 13 is less than the diameter of the current collector 12. These brush elements 13 are adapted to be fitted in contact with the current collector by spreading apart the two legs 15 and are biased towards each other and into engagement with the current collector by a second U-shaped spring member 16 which extends over the outside of the U-shaped spring mounting member 14 with the ends of the spring 16 bent inwardly into engagement with the outer sides of the legs 15. The adjacent legs of the U-shaped spring members 14 and 16 are formed with aligned openings 17 and 18 through which inwardly extending fingers 19 of a supporting bracket 20 are slidably arranged for supporting and guiding the spring and brush elements. This mounting bracket 20 is secured by a screw 21 to a mounting stud 22 supported by a boss 23 formed on an end shield 24 of the dynamoelectric machine. In order to assure good electrical contact between the brushes 13 and the mounting bracket 20 which is made of electrically conductive material, an electrical conductor 25 is connected at 26 to the bracket 20 and is also electrically connected to the U-shaped mounting member 14. With this arrangement, the mounting bracket is rigidly secured to the stationary member of the dynamoelectric machine, and the brush elements 13, together with the supporting and biasing spring members 14 and 16, are slidably supported and guided on the fingers 19 of the mounting bracket 20, so that the brush elements are free to follow any movements of the current collector 12 relative to the stationary mounting bracket 20 and the stationary member of the machine. It has been found that this construction minimizes opening of the circuit between the brush elements and the current collector and provides sparkless current collection, even under extremely adverse vibration conditions.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A brush rigging adapted to contact a rotatable current collector including a U-shaped spring brush-mounting element having a contact brush element supported on each leg of said mounting element adjacent the ends thereof, openings through the legs of said U-shaped spring element, and means including a supporting bracket member having inwardly extending fingers slidably arranged through said openings in said legs of said U-shaped spring element for supporting and guiding said spring and brush elements.

2. A brush rigging adapted to contact a rotatable current collector including a brush-mounting element with a pair of legs having a contact brush element supported on each leg, means including a spring element for biasing said contact brush elements toward each other, openings through the legs of said mounting element, and means including a supporting bracket member having inwardly extending fingers arranged through said openings in said legs of said mounting element for supporting said brush elements.

3. A brush rigging adapted to contact a rotatable current collector including a brush-mounting element with a pair of legs having a contact brush element supported on each leg, means including a spring element for biasing said contact brush elements toward each other, openings through the legs of said mounting element, and means including a supporting bracket member having fingers arranged through said openings in said legs of said mounting element for slidably supporting said brush elements.

4. A brush rigging adapted to contact a rotatable current collector including a brush-mounting element with a pair of legs having a contact brush element supported on each leg, said legs being formed with a space between said brush elements of less than the diameter of said current collector and being adapted to be spread apart and fitted with said brush elements in contact with said current collector, means including a spring element for biasing said contact brush elements toward each other, openings through the legs of said mounting element, means including a supporting bracket member having fingers slidably arranged through said openings in said legs for supporting and guiding said brush elements.

5. A brush rigging adapted to contact a rotatable current collector including a spring brush-mounting element with a pair of legs having a contact brush element supported on each leg, said legs being formed with a space between said brush elements of less than the diameter of said current collector and being adapted to be spread apart and fitted with said brush elements in contact with said current collector, means for biasing said contact brush elements toward each other, openings through the legs of said mounting element, and means including a supporting bracket member having fingers slidably arranged through said openings in said legs for supporting and guiding said brush elements.

6. A brush rigging adapted to contact a rotatable current collector for electrical equipment including a U-shaped spring brush-mounting element having a contact brush element supported on each leg of said mounting element, said legs of said U-shaped spring mounting element being formed with a space between said brush elements of less than the diameter of said current collector, openings through the legs of said U-shaped spring element, means including a supporting bracket member having fingers slidably arranged through said openings in said legs of said U-shaped spring element for supporting and guiding said brush elements, and a current conductor connected to said bracket and to said U-shaped brush mounting element.

7. A brush rigging adapted to contact a rotatable current collector for electrical equipment including a U-shaped spring brush-mounting element having a contact brush element supported on each leg of said mounting element adjacent the ends thereof, said legs of said U-shaped spring mounting element being formed with a space between said brush elements of less than the diameter of said current collector and being adapted to be spread apart and fitted with said brush elements in contact with said current collector, openings through the legs of said U-shaped spring element, and means including a supporting bracket member having fingers arranged through said openings in said legs of said U-shaped spring element for supporting and guiding said brush element.

8. A brush rigging adapted to contact a rotatable current collector for electrical equipment including a U-shaped brush-mounting element having a contact brush element supported on each leg of said mounting element adjacent the ends thereof, means including a U-shaped spring element arranged with the ends in engagement with the outer sides of the legs of said U-shaped mounting element for biasing said contact brush elements toward each other, aligned openings through the adjacent legs of both of said U-shaped elements, and means including a supporting bracket member having inwardly extending fingers slidably arranged through said openings in said legs of both of said U-shaped spring elements for slidably supporting said spring and brush elements.

9. A brush rigging adapted to contact a rotatable current collector for electrical equipment including a U-shaped spring brush-mounting element having a contact brush element supported on each leg of said mounting element adjacent the ends thereof, said legs of said U-shaped spring mounting element being formed with a space between said brush elements of less than the diameter of said current-collector and being adapted to be spread apart and fitted with said brush elements in contact with said current collector, means including a second U-shaped spring element arranged with the ends in engagement with the outer sides of the legs of said U-shaped mounting element for biasing said contact brush elements toward each other, aligned openings through the adjacent legs of both of said U-shaped spring elements, a supporting bracket member having inwardly extending fingers slidably arranged through said openings in said legs of both of said U-shaped spring elements for supporting and guiding said spring and brush elements, and a current conductor connected to said bracket and to said U-shaped brush mounting element.

EDWIN N. OLSON.